United States Patent [19]

Wiggins

[11] 3,988,478

[45] *Oct. 26, 1976

[54] CARBON BLACK

[75] Inventor: Louis E. Wiggins, West Monroe, La.

[73] Assignee: Cities Service Company, Tulsa, Okla.

[ * ] Notice: The portion of the term of this patent subsequent to Aug. 27, 1991, has been disclaimed.

[22] Filed: June 24, 1974

[21] Appl. No.: 482,128

Related U.S. Application Data

[63] Continuation-in-part of Ser. No. 444,947, Feb. 22, 1974, abandoned, which is a continuation-in-part of Ser. No. 316,200, Dec. 18, 1972, Pat. No. 3,832,450.

[52] U.S. Cl. .................................... 423/445; 106/307
[51] Int. Cl.² ............................................ C09C 1/48
[58] Field of Search ........... 423/445, 450, 452, 455, 423/456, 457, 458, 460; 106/307

[56] References Cited

UNITED STATES PATENTS

| | | | |
|---|---|---|---|
| 2,479,708 | 8/1949 | Amon | 423/460 |
| 2,599,981 | 6/1952 | Ekholm | 423/455 |
| 2,980,511 | 4/1961 | Havard | 423/457 |
| 3,222,131 | 12/1965 | Powell et al. | 423/456 |
| 3,226,244 | 12/1965 | Jordan et al. | 423/460 |
| 3,253,890 | 5/1966 | Deland et al. | 423/455 |
| 3,574,547 | 4/1971 | Hinson | 423/445 |
| 3,832,450 | 8/1974 | Wiggins | 423/450 |

OTHER PUBLICATIONS

Dannenberg et al., "Industrial and Engineering Chemistry," vol. 47, No. 2, 1955, pp. 339–344.
Kirk Othmer, Encyclopedia of Chemical Technology, 2nd Ed., 1964, vol. 4, p. 255.

*Primary Examiner*—Edward J. Meros

[57] ABSTRACT

Furnace black products are disclosed which have a particle size of at least 15 millimicrons, a dibutylphthalate absorption (DBP) not exceeding 120 c.c./100 gms., a nitrogen surface area of at least 500 m²/gm., and a volatile content no greater than about 3 weight percent. The volatile and oxygen content of these blacks can be substantially increased by reaction with an oxygenating agent, such as nitric acid, to provide oxygenated carbon blacks which are useful in xerographic toner compositions.

In accordance with the present invention, the furnace black products can be produced in an oil furnace process wherein a stream of liquid water intersects a liquid stream of feedstock hydrocarbon after streams of both liquids have been injected into a heated carbon black furnace. When the water stream contacts the liquid feedstock stream it is relatively cold in comparison to the temperature of the feedstock. Exothermic reaction of the feedstock with free oxygen present in the furnace is caused by contact with the water. More specifically, the water is injected into the feedstock hydrocarbon at a very early stage after it enters the furnace and instead of a quenching, the injection of water caused a flaming reaction of the feedstock with oxygen and thus promotes the formation of carbon black. This burning of the feedstock hydrocarbon in mixture with the injected water is carried out in a section of the furnace reaction chamber which is maintained at a temperature of at least 2600° F., and preferably at a temperature within the range of 2600° to about 3000° F.

8 Claims, 2 Drawing Figures

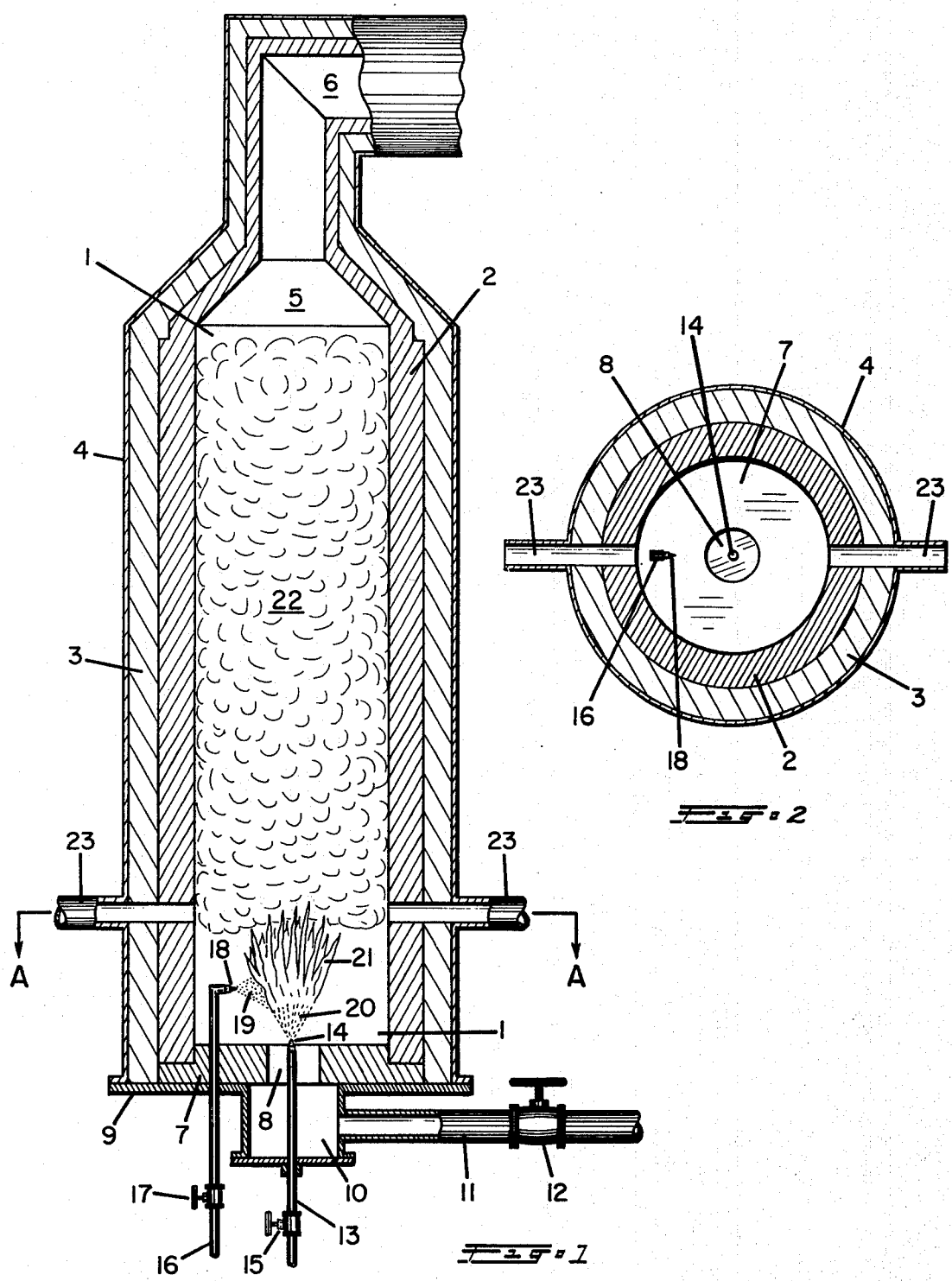

CARBON BLACK

BACKGROUND OF THE INVENTION

This application is a continuation-in-part of application Ser. No. 444,947, filed Feb. 22, 1974, now abandoned; which is a continuation-in-part of application Ser. No. 316,200, filed Dec. 18, 1972, now U.S. Pat. No. 3,832,450 both of which were assigned to the same assignee as this application, and the parent of which is hereby incorporated by reference.

This application pertains to carbon black and more particularly pertains to carbon blacks which can be used as an ingredient in xerographic toner compositions.

It is well known that carbon blacks are included in xeroxgraphic toner compositions in order to impart a black color and other desirable properties to the toner. In the past, medium to high color channel blacks that are produced from natural gas were the carbon blacks of choice for toner formulation since they imparted the best balance of properties to toners which contained them.

More recently, however, it has become apparent that production of channel blacks will have to be further curtailed, if not completely eliminated, not only because of the deminishing supply of natural gas, but also because of increasing manufacturing and marketing costs. Therefore, in order to assure a continuing supply of carbon blacks for use in xerographic toner compositions, it became imperative that they be produced from oil feedstocks instead of natural gas, e.g. via an oil furnace process instead of a channel process.

OBJECTS OF THE INVENTION

It is therefore an object of this invention to provide oil furnace blacks which can be used in xerographic toner compositions.

Another object of this invention is to provide a carbon black for xerographic toner compositions which is produced from oil instead of natural gas.

Even another object is to provide a feedstock carbon black, in the form of a high surface area oil furnace black, which can be oxygenated to produce a carbon black suitable for incorporation into xerographic toner compositions.

Still another object is to provide an oil furnace process for producing carbon blacks which, when subsequently combined with oxygen, impart properties to a xerographic toner which are at least equivalent to if not superior to the properties imparted by channel blacks.

Other objects and advantages of the present invention will become apparent from the following description and the appended claims.

SUMMARY OF THE INVENTION

Broadly, the oil furnace carbon blacks of the present invention have a particle size (arithmetic mean diameter) of at least 15 millimicrons, a dibutylphthalate absorption (DBP) not exceeding 120 c.c./100 gms., a nitrogen surface area of at least 500 $m^2/gm.$, and a volatile content no greater than about 3 weight percent. More specifically, these cabon blacks will have a particle size within the range of 15 to 60 millimicrons, a dibutylphthalate absorption (DBP) within the range of 60 to 120 c.c./100 gms., a nitrogen surface area within the range of 500 to 1000 $m^2/gm.$, and a volatile content of 1–3 weight percent. A specific example of a carbon black products of this invention is one having a particle size of about 30 millimicrons, a dibutylphthalate absorption (DBP) of about 100 c.c./100 gms., a nitrogen surface area of about 575 $m^2/gm.$ and a volatile content of about 1.5 weight percent.

The oxygen content of the present carbon black products is determined by analysis of their volatile content (moisture free), and the content of oxygen of a number of products of the present invention which were examined was not over 2.5 weight percent, and generally within the range of 0.6 to 1.5 weight percent.

The furnace carbon blacks of the present invention can be made in accordance with an improved method which resides in prior oil furnace processes wherein a liquid stream of carbon black feedstock hydrocarbon is injected into a reaction chamber of a carbon black furnace and a portion of the feedstock hydrocarbon is burned with free oxygen in the reaction chamber. Hot combustion gases are produced by the burning of the feedstock hydrocarbon, while the remainder of the feedstock hydrocarbon is thermally decomposed by absorption heat from the hot gases thus formed. An aerosol is formed of carbon black suspended in the combustion gases and gaseous products formed by thermal decomposition of the hydrocarbon, and the carbon black is then separated and recovered from the gaseous constituents of the aerosol.

In accordance with the present method for producing feedstock carbon blacks which are later oxidized, the teaching of the aforementioned parent application, Ser. No. 316,200, is resorted to along with additional new teaching which has been embodied into this application. More specifically, the prior art process just described has been modified to further comprise injecting a stream of liquid water into the liquid carbon black feedstock stream after injection of the feedstock into the furnace reaction chamber. The liquid water is injected into the feedstock stream while the feedstock is still substantially in a liquid phase but after heating of the feedstock stream to a temperature which is substantially in excess of the water stream that is injected into it. The mixture which results from injection of the water stream into the feedstock hydrocarbon stream is immediately burned after the formation thereof.

In addition to the technique just described, part of which is disclosed in the prior art and part of which is disclosed in the parent application, it is also essential that burning of the mixture of feedstock hydrocarbon and injected water be carried out in a section of the funace reaction chamber which is maintained at a temperature of at least 2600° F., and advantageously within the range of 2600° to about 3000° F.

The oil furnace blacks of the present invention can be used as feedstock carbon blacks in a process wherein they are treated with an oxygenating agent such as nitric acid, ozone, or oxygen to produce xerographic toner blacks which have particle size, DBP and nitrogen surface area properties which are not far removed from those of the feedstock blacks. However, these oxygenated blacks are quite different from the feedstock blacks in having a higher volatile and oxygen content. Broadly, the volatile content of these xerographic toner blacks, produced by treatment of the feedstock black for reaction with the oxygenating agent, for combination with oxygen, should be at least 6 weight percent, preferably about 6.5 to about 16.5 weight percent, and advantageously about 9.5 to about 10 weight percent. Since the oxygen content of these xerographic toner blacks is generally within the range of about 60% to 80% of the total volatile content, it can thus be appreciated that the oxygen content thereof is within the range of about 4 to about 13.5 weight percent.

DESCRIPTION IN GREATER DETAIL

The following tables and written description provide further description of the present invention in even greater detail.

Volatile Content

ASTM procedure.

Oxygen Content

When carrying out the test to determine volatile content, the gases which are driven off of the black during heating are carefully collected so as to prevent contamination with air. These collected gases are then analyzed by conventional gas chromotography tech-

| | Oil Furnace Blacks of the Present Invention | | | | |
|---|---|---|---|---|---|
| | Particle Size | DBP | Surface Area | Oxygen Content | Volatile Content |
| In the broadest sense | at least 15 | not over 120 | at least 500 | not over about 2.5 | not over 3 |
| More specifically | 15–60 | 60–120 | 500–1000 | about .6–2.5 | 1–3 |
| Advantageously | 20–45 | 80–120 | 500–700 | about .6–1.5 | about 1–2 |
| More Advantageously | 20–30 | 100–120 | about 500–600 | about .6–1.5 | about 1–2 |
| Specific example | about 25 | about 110 | about 575 | about 1 | about 1.5 |

| | Furnace Blacks of the Present Invention Following Oxygenation to Produce Xerographic Toner Carbons | | | | |
|---|---|---|---|---|---|
| | Particle Size | DBP | Surface Area | Oxygen Content | Volatile Content |
| In the broadest sense | at least 15 | not over 120 | at least 450 | 4 or greater | at least 6 |
| More specifically | 15–60 | 60–120 | 450–1000 | 4–10 | 6.5–16.5 |
| Advantageously | 25–50 | 80–120 | 500–700 6–8 | about 7–13.5 | |
| More advantageously | 25–35 | 100–120 | about 500–600 | 5–7 | about 7–10.5 |
| Specific example | about 30 | about 100 | about 500 | about 6 | about 9.5 |

| | Prior Thermal Blacks, Industrial Oil Furnace Blacks and Channel Blacks, Digested Data From Examination of a Full Spectrum Comprising 30 Previously Available Grades | | | | |
|---|---|---|---|---|---|
| | Particle Size | DBP | Surface Area | Oxygen Content | Volatile Content |
| Where particle size was at least 15 | 16–300 | 35–115 | 10–275 | 0.35–3.2 | 0.5–4.9 |
| Where DBP was not over 120 | 16–300 | 35–115 | 10–275 | 0.35–3.2 | 0.5–4.9 |
| Where surface area was at least 450 | 10–14 | 145–229 | 695–1125 | 7.4–11.6 | 10.5–16.5 |
| Where oxygen content was at least 4 | 10–14 | 145–229 | 695–1125 | 7.4–11.6 | 10.5–16.5 |
| Where volatile content was at least 6 | 10–14 | 145–229 | 695–1125 | 7.4–11.6 | 10.6–16.6 |
| Where volatile content was no greater than 3 | 17–300 | 18–112 | 10–245 | 0.35–1.5 | 0.5–2.2 |

Test Procedure for Determining Properties of Products

Particle Size

Arithmetic mean particle diameter is determined from the method described in "Encyclopedia of Industrial Chemical Analysis", Volume 8, John Wiley and Sons, Inc., 1969.

Dibutylphthalate Absorption (DBP)

ASTM procedure.

Nitrogen Surface Area

As determined by the well-known method of Bauer, Emitt, and Teller (BET), "Encyclopedia of Industrial Chemical Analysis", supra.

niques to determine the percent of oxygen content therein. Once the oxygen content of the collected gas is known, the oxygen content of the carbon black sample, in weight percent, can then be determined.

Remarks Regarding Differences Between Present and Prior Art Products

As can be seen from the above tables, the presently disclosed oil furnace black products are characterized by a combination of properties that is distinctly different from those exhibited by carbon blacks of the prior art. Whereas prior art blacks have exhibited particle sizes and DBP values within the range of the presently claimed products, they have nonetheless also exhibited markedly lower surface areas. Conversally, when the carbon blacks of the prior art exhibited surface areas within the range of the presently claimed products, they have at the same time exhibited lower particle size and higher DBP values.

Since the data for present and prior art blacks that is presented above includes test results from a spectrum of 30 different previously known grades of carbon black, the considerable disparity in combined properties of the present and prior art products emphasizes the novelty of the present products. Furthermore, there was not a previously recognized, suggested, or apparent need for a carbon black having the combination of properties as presently disclosed.

Process For Producing Feedstock Carbon Blacks That Can be Oxygenated to Provide Xerographic Toner Carbons In accordance with the present invention, carbon blacks which can be oxygenated to provide xerographic toner carbons can be produced by means of oil furnace processes wherein a stream of carbon black feedstock hydrocarbon is injected into a furnace wherein the feedstock is vaporized and pyrolized to form carbon black by absorption of heat from hot combustion gases contained within the furnace. The hot combustion gases can be produced either by burning a portion of the carbon black feedstock itself with oxygen or by furning separate fuel such as natural gas or an oil. Oxygen for the burning is made available by mixing the fuel with air, oxygen-enriched air, pure oxygen or the like.

The feedstock hydrocarbon is injected as a liquid stream into the highly heated furnace and a stream of liquid water is then injected into the feedstock while the latter is being mixed with free oxygen but before it becomes substantially vaporized. More specifically, the injected water is forced into a hot feedstock stream in the presence of oxygen while the feedstock is still substantially in a liquid phase but is nonetheless heated to a temperature considerably beyond that of the liquid water that is injected into it.

The amount of liquid water that is injected into the liquid feedstock stream in accordance with the present invention is subject to considerable variation but it has been determined that satisfactory results are obtained when the volume ratio of feedstock hydrocarbon to water is within the range of about 3/1 to about 10/1 when both are measured at 60° F. More specifically, a ratio within the range of about 4/1 to about 6/1 is employed.

As was previously indicated the temperature of the liquid feedstock stream is relatively much hoter than the temperature of the liquid water stream when the two streams collide. More specifically the temperature differential, $\Delta T°$, of the two streams can be within the range of about 300° to about 700° F., and the differential can be even higher provided that most of the feedstock stream is still in a liquid form and no substantial formation of carbon black has occurred when the two streams intersect. In accordance with the present invention a liquid stream of feedstock hydrocarbon having a mean boiling point of about 750°–800° F. can thus be heated to a temperature of about 500° to 800° F. when intersected by a stream of liquid water having a temperature within the range of about 100° to 200° F.

The temperature of the feedstock hydrocarbon stream can be raised to the required temperature by preheating prior to injection into the furnace and/or by absorption of radiant heat after injection into the furnace. Superheated water can be employed in achieving the indicated $\Delta T°$, but this does not generally provide any advantage because the highest possible $\Delta T°$ between the feedstock and the water is generally desired, and since oil furnace black processes are usually operated at pressure conditions which are close to atmospheric pressure, and use of liquid water is essential in the present method as opposed to use of steam.

Proper conditions of mixing between the liquid water and hydrocarbon treams is characterized by a flaming with the free oxygen that is made present and by an increase in the temperature of the resulting mixture immediately beyond the point at which the water stream intersects the feedstock hydrocarbon stream. If the feedstock to water ratio is properly established and the $\Delta T°$ between the two streams is sufficiently great, a violent, almost explosive reaction occurs (akin to pouring cold water into very hot grease or oil) and this results in the development of a fast, blue flame.

It will thus be appreciated that use of liquid water for producing the feedstock carbon blacks of the present invention is entirely different from use of liquid water as a cooling medium in quenching procedures of the prior art. In production of the carbon black feedstocks the water must be separately injected into the furnace and be in a liquid phase when it contacts the hot, liquid feedstock hydrocarbon in the presence of free oxygen since equivalent results are not obtained if either liquid water or steam is mixed with the liquid feedstock beforehand or if steam is introduced into the furnace separately.

To accomplish mixing of the liquid feedstock hydrocarbon stream with water during production of the feedstock carbon blacks, more or less conventional apparatus can be employed. The feedstock can, for instance, be injected into the furnace reaction chamber by means of well-known solid or hollow cone sprayers while employing a similar sprayer for the water. Positioning of the feedstock and water injection points relative to each other is important in assuring that both streams are liquid when they intersect and that the proper $\Delta T°$ is established. By use of positionable sprays, the optimum spatial relationship between the two points can be easily determined after conducting a few simple experiments while following the present disclosure as a guideline.

As was indicated previously, a fuel such as natural gas or an oil can be burned to produce hot combustion gases within which the unburned portion of the feedstock hydrocarbon is pyrolyzed in the furnace to produce carbon black. Alternatively, part of the injected carbon black feedstock can be burned as the fuel so that vaporization and pyrolysis of the remaining feedstock is accomplished by contact with the resulting hot gases. Air is preferred for supplying oxygen for combustion of the fuel, and in any event free oxygen must be made available for mixture with the stream of feedstock that is in turn mixed with the stream of liquid water so that the previously described blazing reaction and partial combustion of the feedstock occurs at a very early stage and preferably before the remaining portion of the feedstock is pyrolyzed in the hot combustion gases beyond the flame in order to complete the formation of carbon black.

Proportioning of the feedstock with the hot combustion gases is subject to considerable variation and can be selectively adjusted and then maintained according to known furnacing practices for the production of carbon black having a specific particle size. Input rate of the feedstock to the furnace and the production rate of hot combustion gases is also subject to variation in the usual sense depending upon the type of carbon black being produced and the size of the furnace being used.

The amount of free oxygen which should be made available for mixture and partial combustion of the feedstock hydrocarbon is subject to variation depending upon the extent of reaction and the resulting alteration of carbon black properties which may be desired. To considerable advantage air which is uncontaminated by combustion or pyrolysis products can be made available for mixture with the incoming hydrocarbon stream at the point of intersection with the water stream.

Therefore, features of the presently claimed oil furnace process which are subject to variation include the type and size of furnace that is employed, use of a portion of the injected feedstock as the fuel as opposed to burning of another hydrocarbon, proportioning of air and fuel, except that free oxygen must be made available for mixture with the liquid stream of feedstock at the point where the water is injected into it, and proportioning of the feedstock in the hot combustion gases created by burning of the fuel. Apparatus and conditions of the prior art can be used while otherwise excepting those differences as are defined in the claims. It will be appreciated, however, that the furnace can, to advantage, have a relatively enlarged reaction zone into which air and liquid feedstock can be axially injected so that the resulting blazing, exothermic reaction of the feedstock with oxygen by injection of water goes unimpeded and impingement of unvaporized feedstock hydrocarbon on the walls of the reaction chamber is thus avoided.

It is essential in the presently disclosed oil furnace process that high temperatures be employed in the section of the furnace where the mixture of feedstock hydrocarbon and injected water is burned. More specifically, temperatures in this particular section of the furnace should be maintained at a temperature of at least 2600° F., and more preferably within the range of 2600° to about 3000° F. To advantage, the furnace reaction chamber can be vertically elongated, with the feedstock hydrocarbon and air streams being introduced axially upward into a lower section of the chamber. Accordingly, a portion of the feedstock hydrocarbon is burned in the lower section of the furnace as fuel during burning of the mixture for producing the hot combustion gases within which the unburned portion of the feedstock hydrocarbon is thermally decomposed, with thermal decomposition of the remainder of the feedstock occurring within a blanket which resides in an upper section of the reaction chamber.

With reference to FIGS. 1 and 2, of the drawing, the invention will now be described with respect to an oil furnace process whereby the aforementioned relatively coarse, high surface area carbon blacks are produced.

FIG. 1 is a sectional side view of a vertically elongated cylindrical furnace that can be used in the practice of the invention.

FIG. 2 is a cross-sectional view of the furnace of FIG. 1 taken along the line A-A of FIG. 1 and shown in a somewhat smaller scale.

The cylindrical reaction chamber or carbon black formation zone 1 of the furnace is surrounded by a refractory wall 2, a layer of insulation 3, and an outer metal sheath 4. The furnace has a conical top section 5 which connects with a breeching 6. The breeching leads into a cooler and then into a conventional separatory system, neither of which is shown. The carbon black aerosol is quenched with water in the cooler and the carbon black is then separated and recovered from the aerosol by means of the separatory system.

The bottom of the furnace has a refractory floor 7 with a central opening 8 which leads into chamber 1. The floor 7 is supported by a bottom plate 9 which is attached to the sheath 4. An air box 10 is attached to the bottom plate 9 and is aligned over the floor opening 8 so that air which is blown into the box 10 through conduit 11 is discharged upwardly into chamber 1. The flow of air through conduit 11 and into the furnace is controlled by means of a valve 12.

Liquid feedstock hydrocarbon is injected into the furnace chamber by means of a sprayer 13 having an atomizer tip 14 and a flow-control valve 15. Another sprayer 16 extends through the floor 7 of the furnace and into chamber 1 and is provided with a flow-control valve 17 and an atomizer tip 18. Sprayer 16 is used to inject a stream of liquid water 19 into the stream of liquid feedstock hydrocarbon 20 that is injected into the furnace. The atomizer tip 18 is directed perpendicularly with respect to the axis along which the feedstock hydrocarbon is discharged from atomizer tip 14, thereby assuring intersection of the liquid water stream 19 and the liquid feedstock stream 20. It is preferable that both the feedstock sprayer 13 and the water sprayer 16 be adjustable along their longitudinal axes to permit altering of the location at which the water and feedstock streams intersect within chamber 1.

In operation, air, feedstock hydrocarbon and water are fed into the furnace at substantially constant, preestablished rates through conduit 11 and the sprayers 13 and 16 respectively. Ignition of the resulting mixture following collision of the water stream 19 and the hydrocarbon stream 20 in the presence of air entering the furnace through floor opening 8 results in formation of flame 21 above the floor 7 of the furnace. The flame is caused by combustion of part of the feedstock hydrocarbon stream 20 with the entering air and is initiated and promoted by injection of the water stream 19, as previously described. As the unburned portion of the feedstock hydrocarbon continues to travel upward in chamber 1, it becomes mixed with hot combustion gases produced by the flame and is thereby further vaporized and pyrolyzed by absorption of heat from the hot gases. A blanket 22 is formed in the upper part of chamber 1 and consists of carbon black, partially decomposed hydrocarbons from the feedstock, hot combustion gases, and gaseous products which result from pyrolysis of the feedstock.

Temperatures within the furnace reaction chamber are maintained within the range of about 2300°–3000° F. Injection of water into the furnace in accordance with the present invention is insufficient to cause any significant overall quenching effect, but can cause a substantial alteration of the temperature profile along the length of the furnace chamber.

The effluent from the furnace which enters breeching 6 is an aerosol of carbon black suspended in gaseous products of combustion and thermal decomposition of the feedstock hydrocarbon. Since the reaction chamber 1 is elongated and highly heated, the carbon black of the effluent aerosol will contain little if any oily residue (stain) from pyrolysis of the feedstock, i.e. thermal decomposition of the feedstock can be carried essentially to completion within the reaction chamber.

To facilitate the development of high temperatures within the reaction chamber 1, auxiliary air can be introduced at controlled rates through conduits 23 for burning of combustible gaseous products of the pyrolysis reaction which reside in the blanket 22.

As was previously indicated, the temperature in the lower section of the furnace reaction chamber should be maintained at a temperature of at least 2600° F. where burning of the mixture of feedstock hydrocarbon and water takes place. This can be accomplished by directing air from conduits 23 into the mixture, using a rate and amount of air which further intensifies the burning. More particularly, the flow rates and mixing of primary and secondary air, feedstock hydrocarbon and water should be established in such a fashion as to provide temperatures in the lower end of the chamber which are at least 2600° F., preferably 2600° to about 3000° F. Temperatures in the middle section of the furnace reaction chamber can range upwards from 2600° F., whereas somewhat lower temperatures can be maintained in the top section, e.g. 2200°–2400° F., and preferably about 2300° F.

Although not wishing to be bound by theory, the following explanation is offered in an attempt to explain why relatively coarse blacks having high surface areas are produced by means of the present process. It is felt that in the distance between the atomizer tip 14 and the water stream 19, the feedstock hydrocarbon 20 is partially vaporized while the initial stages of the reaction for forming carbon black begins, all within a time period of only a few milliseconds. The water stream 19 slows down the reaction of heavier liquid materials in the feedstock hydrocarbon which have higher carbon content and leads to selective burning of the hydrogen content of the lighter ends of the feedstock with oxygen introduced into the reactor. Beyond this, it is felt that introduction of the relatively cold water into the hot oil stream leads to an explosive breakup of the oil droplets by sudden vaporization of the water. The turbulence created by this effect increases the rates at which the feedstock hydrocarbon is partially burned and thermally decomposed. Further downstream, carbon black and water vapor are in contact at high temperatures which lead to a heterogeneous water gas reaction on the formed carbon particles and results in a high surface area.

It will be apparent to those skilled in the art that such properties as particle size and DBP of the present carbon black products can be fully regulated over the limits of the claimed ranges by means of known techniques, e.g. particle size can be regulated by varying the feedstock rate whereas DBP can be regulated by introduction of alkali metal salts in varied amounts. Surface area can be regulated by varying the flow rate of water stream 19 and by regulation of temperature within the reaction chamber. The relatively low volatile and oxygen content of the feedstock carbon blacks of this invention is incidental to their surface characteristics and the high temperature at which they are formed. The amount of volatile and oxygen which is combined with the feedstock blacks through treatment to produce the oxygenated blacks can be regulated by varying the amount of oxygen which is brought into contact with the black and the temperature of reaction during the treatment process.

EXAMPLES

Production of Feedstock Carbon Black

A furnace arrangement substantially the same as shown in FIGS. 1 and 2 was employed in the production of carbon black. The reaction chamber 1 had a diameter of 4.25 feet and a height of 12 feet. The diameter of the floor opening 8 was 14 inches. A typical analysis for the feedstock hydrocarbon used is shown below:

| Feedstock Analysis | |
| --- | --- |
| API Gravity | 0.2 |
| Viscosity - SSU-130° F. | 594 |
| SSU-210° F. | 67 |
| Molecular Weight | 295 |
| Index of Refraction | 1.648 |
| % Sulfur | 1.06 |
| % Ash | 0.003 |
| % Carbon | 90.74 |
| % Hydrogen | 8.42 |
| % Benzene Insoluble | 0.039 |
| % Asphaltenes | 0.05 |
| Average Boiling Point | 790° F. |
| UOP K Factor | 10.0 |

Experiment I

With the feedstock atomizer tip 14 centered in the floor opening 8 flush with the upper surface of the floor 7, the feedstock was injected into the furnace at a rate of 68 gallons per hour (60° F), after having been preheated to a temperature of about 200° F. Air, preheated to 700° F., was injected into the furnace through floor opening 8 at the rate of 43,500 cubic feet per hour and through conduits 23 at the rate of 21,000 cubic feet per hour (60° F.). Water at 75° F. was fed to the atomizer tip at the rate of 19 gallons per hour, while the water atomizer tip was located 4 inches above the top surface of the furnace floor, 16 inches from the longitudinal center line of the feedstock sprayer 13 and the tip was directed perpendicularly toward the longitudinal center line. Atomizer tips 14 and 18 discharged a hollow cone of droplets at an angle of 60° and 80° respectively.

Potassium hydroxide was injected into the furnace to supress formation of carbon black structure, being contained in the feedstock hydrocarbon stream, with 0.00182 lbs. of the KOH being introduced with each gallon of oil.

Throughout this particular run, the temperature in the lower section of the furnace was at about 2650° F., at about 2700° F. in the middle section, and at about 2300° F in the upper section. It should be noticed that this is in contrast to the operating examples described in the copending parent application, Ser. No. 316,200 wherein temperatures in the lower end of the furnace were maintained at about 2400° F. and at about 2500°–2600° F. in the upper section.

The carbon black aerosol which was discharged from the furnace in the present example was not quenched with water until it had traveled about 40 feet through the breeching 6 to the cooler, and at which point sufficient water was injected to reduce the temperature of the aerosol to about 450° F. Subsequently, the carbon black was recovered and tested and found to exhibit the following properties:

| | |
|---|---|
| Particle Size | 30 mµ |
| DBP | 115 c.c./100 gms. |
| Surface Area, N₂ | 575 m²/gm. |
| Volatile Content | 1.4 weight percent |
| Oxygen Content | .84 weight percent |

Oxygenation of Feedstock Carbon Black

The oil furnace black produced in the preceeding example was fed into a wet pelletizing machine at the rate of 177 lbs./hr. while 67.5% nitric acid was fed to the pelletizer at the rate of 253 lbs./hr. The pelletizer was used only as a mixer for the black and acid; it was not essential that the black be pelletized.

The mixture of carbon black acid was discharged into a rotary drum wherein the mixture was heated to effect evaporation of water and reaction of the black with oxides of nitrogen. Calculated residence time of the carbon black in the drum was about 3 hours, and it was discharged from the drum at a temperature of 270° F. One objective during the treatment was to maintain the temperature of the drying-oxidizing reaction as low as possible while drying the black to an acceptable level, i.e. to a moisture content of no more than 2%, more preferably below 1%.

The oxygenated carbon black was allowed to cool following the recovery thereof and on testing was found to have the following properties:

| | |
|---|---|
| Particle Size | 30 mµ |
| DBP | 106 c.c./100 gms. |
| Surface Area, N₂ | 550 m²/gm. |
| Volatile Content | 8.0 weight percent |
| Oxygen Content | 5.5 weight percent |
| Moisture Content | 0.6 weight percent |

The oxygenated carbon black of this example was utilized in the preparation of a xerographic toner and was found to impart better properties to the toner than a channel black which had previously been the toner black of choice. This channel black was characterized by the following properties:

| | |
|---|---|
| Particle Size | 12 mµ |
| DBP | 224 c.c./100 gms. |
| Surface Area, N₂ | 787 m²/gm. |
| Oxygen Content | 8.1 weight percent |

It can thus be seen that the presently claimed oxygenated blacks are notably different from this channel black which was previously employed as the toner carbon of choice, most notably by a much higher DBP and a significantly lower particle size. Greater details on oxygenated carbon black products and process conditions for producing them are disclosed in copending application, Ser. No. 482,127, filed June 24, 1974, now U.S. Pat. No. 3,959,008, and assigned to the same assignee as this application.

Therefore, carbon black products have been developed which were heretofore unknown and unobvious in that they are characterized by such a different combination of properties as would have previously caused one skilled in the art to doubt that they could have utility. More particularly, these new blacks are different in being characterized by particle sizes and surface areas which are relatively high with respect to the DBP's thereof.

While the present invention has been described with reference to particular properties, tests, process conditions, apparatus, applications of use, and the like, it will nonetheless be understood that even other embodiments which have not been specifically described will become apparent which are within the spirit and scope of the invention defined in the following claims.

What is claimed is:

1. A furnace carbon black having a particle size within the range of 15 to 60 millimicrons, a dibutylphthalate absorption (DBP) within the range of 60–120 c.c./100 gms., a nitrogen surface area within the range of 500 to 1000 m²/gm., and a volatile content of 1 to 3 weight percent.

2. A furnace black as in claim 1 having an oxygen content of about 0.6 to about 2.5 weight percent.

3. A furnace carbon black having a particle size of about 20 to about 45 millimicrons, a dibutylphthalate absorption (DBP) of about 80 to about 120 c.c./100 gms., a nitrogen surface area of about 500 to about 700 m²/gm., and a volatile content of about 1 to about 2 weight percent.

4. A furnace black as in claim 3 having an oxygen content of about 0.6 to about 1.5 weight percent.

5. A furnace carbon black having a particle size of about 20 to about 30 millimicrons, a dibutylphthalate absorption (DBP) of about 100 to about 120 cc/100 gms., a nitrogen surface area of about 500 to 600 m²/gm., and a volatile content of about 1 to about 2 weight percent.

6. A furnace black as in claim 5 having an oxygen content of about 0.6 to about 1.5 weight percent.

7. A furnace carbon black having a particle size of about 25 millimicrons, a dibutylphthalate absorption (DBP) of about 110 c.c./100 gms., a nitrogen surface area of about 575 m²/gm., and an oxygen content of about 1.5 weight percent.

8. A furnace black as in claim 7 having an oxygen content of about 1 weight percent.

* * * * *